(12) United States Patent
Zhao et al.

(10) Patent No.: US 12,201,899 B2
(45) Date of Patent: Jan. 21, 2025

(54) DATA PACKET SYNCHRONIZATION METHOD AND APPARATUS, DEVICE, AND STORAGE MEDIUM

(71) Applicant: TENCENT TECHNOLOGY (SHENZHEN) COMPANY LIMITED, Shenzhen (CN)

(72) Inventors: Kun Zhao, Shenzhen (CN); Guopei Xu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 253 days.

(21) Appl. No.: 17/884,431

(22) Filed: Aug. 9, 2022

(65) Prior Publication Data
US 2022/0379202 A1 Dec. 1, 2022

Related U.S. Application Data

(63) Continuation of application No. PCT/CN2021/100479, filed on Jun. 17, 2021.

(30) Foreign Application Priority Data

Jul. 31, 2020 (CN) .......................... 202010760504.9

(51) Int. Cl.
*G06F 17/00* (2019.01)
*A63F 13/35* (2014.01)
*G06F 9/54* (2006.01)

(52) U.S. Cl.
CPC .............. *A63F 13/35* (2014.09); *G06F 9/546* (2013.01)

(58) Field of Classification Search
CPC ...... A63F 13/31; A63F 13/35; A63F 2300/53; G06F 15/17325; G06F 2209/5018; G06F 9/5027; G06F 9/546
See application file for complete search history.

(56) References Cited

U.S. PATENT DOCUMENTS 6,134,237 A * 10/2000 Brailean ............... H04L 1/1809
370/242
2003/0204565 A1 * 10/2003 Guo ..................... H04L 12/4641
709/205

(Continued)

FOREIGN PATENT DOCUMENTS

CN 104572290 A 4/2015
CN 109271447 A 1/2019

(Continued)

OTHER PUBLICATIONS

The World Intellectual Property Organization (WIPO) International Search Report for PCT/CN2021/100479 Sep. 15, 2021 6 pages (including translation).

(Continued)

*Primary Examiner* — Lawrence S Galka
(74) *Attorney, Agent, or Firm* — ANOVA LAW GROUP PLLC

(57) ABSTRACT

Disclosed in this application are a data packet synchronization method and apparatus, a device, and a storage medium, relating to the field of data communication. The method includes receiving a data packet transmitted by a client, the data packet including a thread identifier and a frame identifier, the thread identifier being added by the client according to a logical operation type required by the data packet, the frame identifier being used for identifying a picture frame triggering the data packet; writing, after the data packet is transmitted to a logical thread corresponding to the thread identifier for a logical operation, a data packet obtained after the operation into a message queue corresponding to the logical thread; and reading the data packet obtained after the operation from the message queue according to the frame identifier, and synchronizing the data packet obtained after the operation to an associated client.

20 Claims, 9 Drawing Sheets

Receive a data packet transmitted by a client, the data packet carrying a thread identifier and a frame identifier, the thread identifier being added by the client according to a logical operation type required by the data packet, the frame identifier being used for identifying a picture frame triggering the data packet — 301

Write, after the data packet is transmitted to a logical thread corresponding to the thread identifier for a logical operation, a data packet obtained after the operation into a message queue corresponding to the logical thread — 302

Read the data packet obtained after the operation from the message queue according to the frame identifier, and synchronize the data packet obtained after the operation to a client associated with the client — 303

(56) References Cited

U.S. PATENT DOCUMENTS

| | | | | |
|---|---|---|---|---|
| 2004/0152519 A1* | 8/2004 | Wang | ............... | H04L 67/131 |
| | | | | 463/42 |
| 2008/0313346 A1* | 12/2008 | Kujawa | ............... | H04L 47/10 |
| | | | | 709/236 |
| 2009/0291763 A1* | 11/2009 | Guo | ............... | H04L 67/61 |
| | | | | 463/42 |
| 2014/0177643 A1 | 6/2014 | Finney et al. | | |
| 2014/0177644 A1 | 6/2014 | Finney | | |

FOREIGN PATENT DOCUMENTS

| | | | |
|---|---|---|---|
| CN | 109697123 | A | 4/2019 |
| CN | 110162418 | A | 8/2019 |
| CN | 111013133 | A | 4/2020 |
| CN | 111282263 | A | 6/2020 |
| CN | 111737021 | A | 10/2020 |

OTHER PUBLICATIONS

The State Intellectual Property Office of the People's Republic of China (SIPO) Office Action 1 for 202010760504.9 Oct. 13, 2020 8 pages (including translation).

* cited by examiner

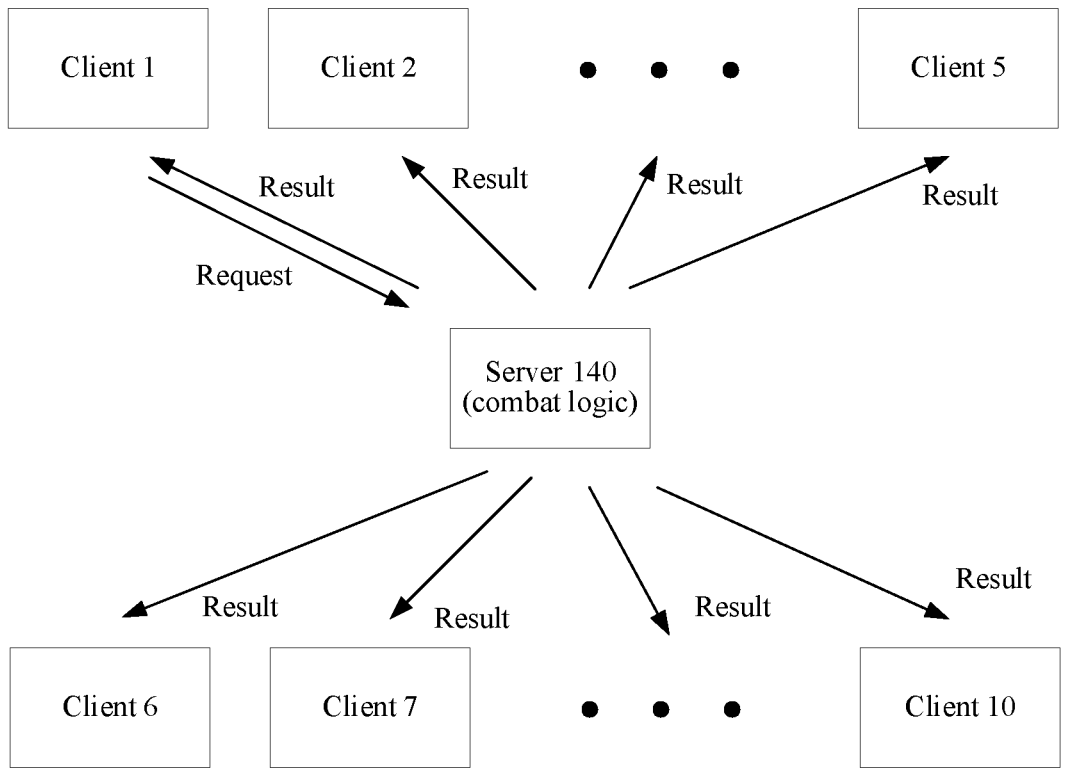

FIG. 2

| Receive a data packet transmitted by a client, the data packet carrying a thread identifier and a frame identifier, the thread identifier being added by the client according to a logical operation type required by the data packet, the frame identifier being used for identifying a picture frame triggering the data packet | — 301 |

| Write, after the data packet is transmitted to a logical thread corresponding to the thread identifier for a logical operation, a data packet obtained after the operation into a message queue corresponding to the logical thread | — 302 |

| Read the data packet obtained after the operation from the message queue according to the frame identifier, and synchronize the data packet obtained after the operation to a client associated with the client | — 303 |

FIG. 3

DATA PACKET SYNCHRONIZATION METHOD AND APPARATUS, DEVICE, AND STORAGE MEDIUM

RELATED APPLICATIONS

This application is a continuation application of PCT Application No. PCT/CN2021/100479 filed on Jun. 17, 2021, which in turn claims priority to Chinese Patent Application No. 202010760504.9, entitled "DATA PACKET SYNCHRONIZATION METHOD AND APPARATUS, DEVICE, AND STORAGE MEDIUM" and filed with the National Intellectual Property Administration, PRC on Jul. 31, 2020. The two applications are both incorporated herein by reference in their entirety.

FIELD OF THE TECHNOLOGY

This application relates to the field of data communication, and in particular, to data packet synchronization.

BACKGROUND OF THE DISCLOSURE

When a user plays a game on a game client, the game client generates a data packet according to an operation of the user and transmits the data packet to a server. the game client generates a data packet according to an operation of the user and transmits the data packet to a server. Current server may not be able to process the received data packets in good order and cause errors.

SUMMARY

Embodiments of this application provide a data packet synchronization method and apparatus, a device, and a storage medium. A corresponding message queue is assigned to each logical thread, thereby reducing internal memory occupied by message queues in a server. The technical solutions are as follows.

According to an aspect of this application, a data packet synchronization method is provided, the method being applied to a server, k logical threads and k message queues being set on the server, k being a positive integer, the logical threads corresponding one to one to the message queues, the logical threads being categorized according to a logical operation type. The method includes receiving a data packet transmitted by a client, the data packet including a thread identifier and a frame identifier, the thread identifier being added by the client according to a logical operation type required by the data packet, the frame identifier being used for identifying a picture frame triggering the data packet; writing, after the data packet is transmitted to a logical thread corresponding to the thread identifier for a logical operation, a data packet obtained after the operation into a message queue corresponding to the logical thread; and reading the data packet obtained after the operation from the message queue according to the frame identifier, and synchronizing the data packet obtained after the operation to an associated client.

According to another aspect of this application, a computer device is provided. The computer device includes a processor and a memory. The memory stores at least one instruction, at least one program, a code set or an instruction set. The at least one instruction, the at least one program, the code set, or the instruction set is loaded or executed by the processor to implement the data packet synchronization method in the foregoing aspects.

According to another aspect of this application, a non-transitory computer-readable storage medium is provided. The computer-readable storage medium stores a computer program. The computer program is used for performing the data packet synchronization method in the foregoing aspects.

In embodiments consistent with the present disclosure, corresponding message queues are assigned to logical threads categorized according to a logical operation type, to allow a user to write a data packet obtained after a logical thread operation into a message queue corresponding to each logical thread, to avoid a write conflict of data packets when a plurality of threads share one message queue. In addition, the number of message queues is reduced to reduce internal memory of the server occupied by message queues, thereby reducing the cost of message management.

BRIEF DESCRIPTION OF THE DRAWINGS

FIG. 2 is a schematic diagram of a status synchronization technology according to an embodiment of this application.

FIG. 3 is a flowchart of a data packet synchronization method according to an embodiment of this application.

DESCRIPTION OF EMBODIMENTS

Figure 1:
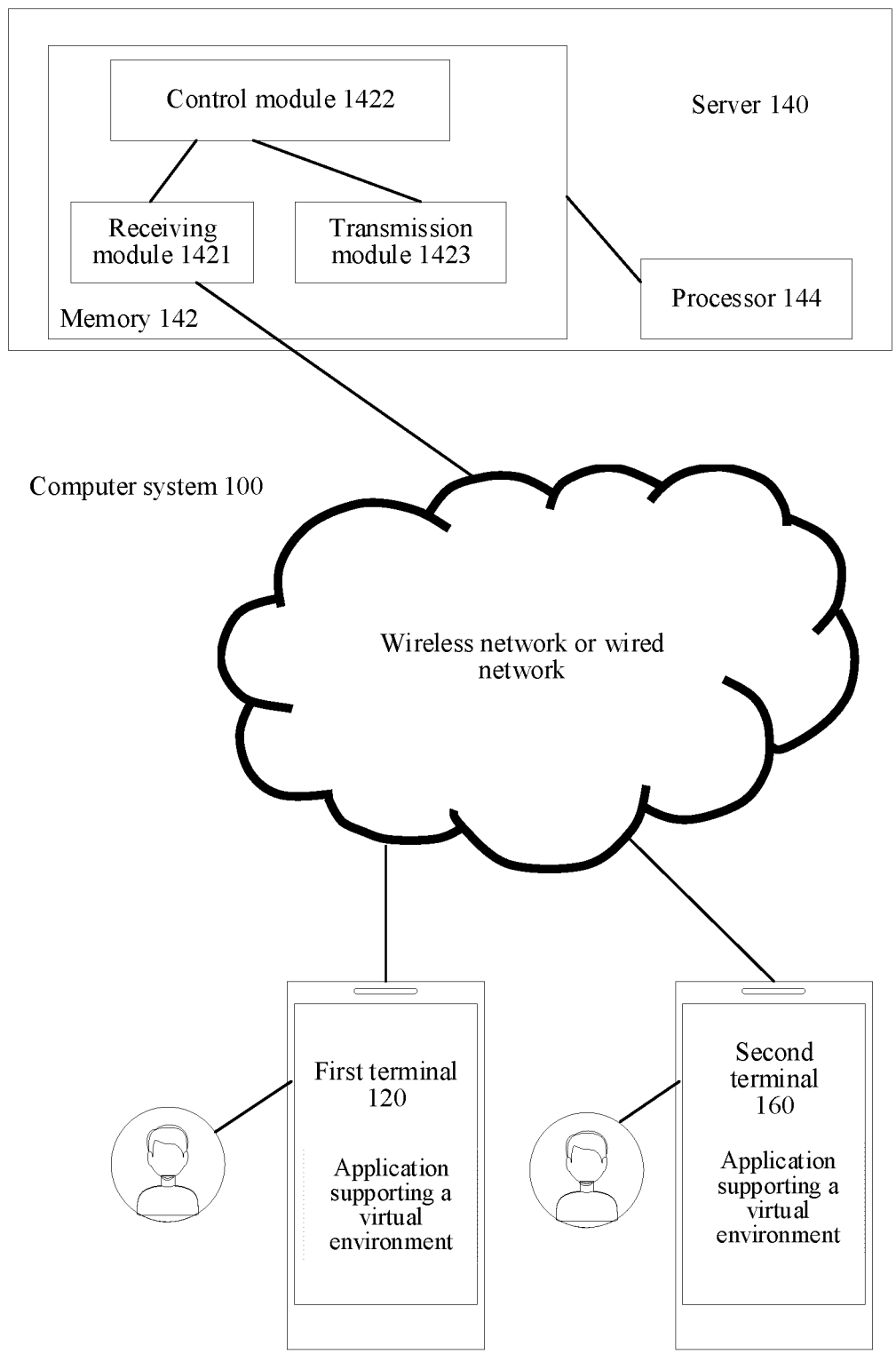
FIG. 1 is a framework diagram of a computer system according to an embodiment of this application.

To make the objectives, technical solutions, and advantages of this application clearer, the implementations of this application are further described below in detail with reference to the accompanying drawings.

First, the terms described in the embodiments of this application are introduced.

Message Queue (MQ): An MQ is a communication mode between applications and is used for storing messages (or data). A message queue follows a first in, first out principle.

For example, a message 1 is written into the message queue before a message 2. During message reading, the message 1 is read before the message 2. A message generator (message publisher) publishes a message into a message queue. A message consumer (an active message acquirer) acquires the message from the message queue. The generator and the consumer do not interfere with each other.

Cyclic barrier (CB): Under a multi-thread condition, a plurality of threads cooperate with each other to complete a task, and a cyclic barrier is required to perform coordination between the plurality of threads, to avoid the problem of temporal confusion in the plurality of threads. In the embodiments of this application, a frame identifier of one frame of environment picture is used as a cyclic barrier. When message queues all read the same frame identifier (cyclic barrier), it indicates that data packets corresponding to the frame of picture have been read, and the message queues may read data packets corresponding to a next frame of picture.

Dirty flag: A dirty flag is used for identifying whether current data is consistent with original data. If the current data is inconsistent with the original data, the current data is recalculated, and the dirty flag is changed from 0 to 1. A dirty flag (the dirty flag is 0) is set again for a result obtained after the calculation. If the current data is consistent with the original data, the dirty flag is kept as 1 to continue to use the original data (current data). When the dirty flag is 0, it represents that data remains unchanged. When the dirty flag is 1, it represents that data has changed. The embodiments of this application are described by using an example in which a dirty flag is set for an attribute parameter of a virtual object. The attribute parameter is data of a second type data packet (for example, an attribute data packet). For example, a dirty flag is set for health points of a virtual object. When the health points of the virtual object have changed (restored or reduced), the dirty flag is changed from 0 to 1. When the health points of the virtual object remain unchanged, the dirty flag is still 0.

Cloud computing: Cloud computing refers to a delivery and use mode of IT infrastructure, and required resources are obtained through a network in an on-demand, easily expandable manner. General cloud computing refers to a delivery and use mode of services, and required services are obtained through a network in an on-demand, easily expandable manner. Such services may be IT services related to software and Internet or may be other services. Cloud computing is a product of developing and integrating computer and network technologies such as grid computing, distributed computing, parallel computing, utility computing, network storage technologies, virtualization, and load balance.

With the diverse development of the Internet, real-time data streams, and connection devices, and driven by requirements such as search services, social networks, mobile commerce, and open collaborations, cloud computing has developed rapidly. Different from previous parallel distributed computing, the emergence of cloud computing conceptually promotes the revolutionary change of the entire Internet mode and enterprise management mode. The data packet synchronization method provided in the embodiments of this application is applicable to a cloud server. A corresponding message queue is assigned to each logical thread. Therefore, when the cloud server reads data packets, an order of the data packets is immune to confusion, so that the data packets are transmitted to clients in a correct order, thereby reducing the cost of message management.

FIG. 1 is a structural block diagram of a computer system according to an embodiment of this application. The computer system 100 includes a first terminal 120, a server 140, and a second terminal 160.

An application supporting a virtual environment is installed and run on the first terminal 120. The application may be any one of a virtual reality application, a three-dimensional map program, a military simulation program, an FPS game, a MOBA game, a Massive Multiplayer Online Role-Playing Game (MMORPG), a multiplayer shooting survival game, a battle royale shooting game, a virtual reality (VR) application, and an augmented reality (AR) program. The first terminal 120 is a terminal used by a first user, and the first user uses the first terminal 120 to control a first virtual object in the virtual environment to perform a movement. The movement includes, but is not limited to, at least one of body posture adjustment, walking, running, jumping, cycling, aiming, picking-up, casting a skill, changing a skin, or attacking another virtual object. For example, the first virtual object is a first virtual character, for example, a simulated character object or a cartoon character object.

The first terminal 120 is connected to the server 140 by using a wireless network or a wired network.

The server 140 may be an independent physical server, or may be a server cluster or a distributed system formed by a plurality of physical servers, or may be a cloud server providing basic cloud computing services, such as a cloud service, a cloud database, cloud computing, a cloud function, cloud storage, a network service, cloud communication, a middleware service, a domain name service, a security service, a content delivery network (CDN), and a big data and artificial intelligence platform. For example, the server 140 includes a processor 144 and a memory 142. The memory 142 includes a receiving module 1421, a control module 1422, and a transmission module 1423. The receiving module 1421 is configured to receive a data packet transmitted by a client, for example, a data packet generated from an $i^{th}$ frame of virtual environment picture. The control module 1422 is configured to read a data packet from a message queue. The transmission module 1423 is configured to transmit data packets to clients. The server 140 is further configured to provide a backend service, for example, an information storage service, to an application supporting a three-dimensional virtual environment. In some embodiments, the server 140 takes on primary computing work, and the first terminal 120 and the second terminal 160 take on secondary computing work. Alternatively, the server 140 takes on secondary computing work, and the first terminal 120 and the second terminal 160 take on primary computing work. Alternatively, collaborative computing is performed by using a distributed computing architecture among the server 140, the first terminal 120, and the second terminal 160.

The server 140 may use a synchronization technology to implement consistent picture representation of a plurality of clients. For example, the synchronization technology used by the server 140 includes a status synchronization technology or a frame synchronization technology. The data packet synchronization method provided in the embodiments of this application may be implemented based on the status synchronization technology.

In one embodiment based on FIG. 1, the server 140 uses the status synchronization technology to synchronize with a plurality of clients. In the status synchronization technology, as shown in FIG. 2, a combat logic is run on the server 140. When a virtual object in a virtual environment undergoes a status change, the server 140 transmits a status synchronization result to all clients, for example, a client 1 to a client 10.

In an example, the client 1 transmits a request to the server 140. The request is used for requesting a virtual object 1 to attack a virtual object 2. The server 140 determines whether the virtual object 1 can attack the virtual object 2 and determines the remaining health points of the virtual object 2 when the virtual object 1 performs an operation of attacking the virtual object 2. Next, the server 140 transmits the remaining health points of the virtual object 2 to all the clients. All the clients update local data and interface representation according to the remaining health points of the virtual object 2.

An application supporting a virtual environment is installed and run on the second terminal 160. The application program may be any one of a virtual reality application program, a three-dimensional map program, a military simulation program, an FPS game, a MOBA game, an MMORPG game, a multiplayer shooting survival game, a battle royale shooting game, a VR application, and an AR program. The second terminal 160 is a terminal used by a second user, and the second user uses the second terminal 160 to control a second virtual object in the virtual environment to perform a movement. The movement includes, but is not limited to, at least one of body posture adjustment, walking, running, jumping, cycling, aiming, casting a skill, changing a skin, picking-up, or attacking another virtual object. For example, the second virtual object is a second virtual character, for example, a simulated character object or a cartoon character object.

In some embodiments, the first virtual character object and the second virtual character object are located in the same virtual environment. In some embodiments, the first virtual character object and the second virtual character object may belong to the same team, the same organization or the same side, have a friend relationship, or have a temporary communication permission. In some embodiments, the first virtual person and the second virtual object may belong to different sides, different teams or different organizations or may be enemies of each other.

In some embodiments, the applications installed on the first terminal 120 and the second terminal 160 are the same, or the applications installed on the two terminals are the same type of applications on different operating system platforms (Android or iOS). The first terminal 120 may be generally one of a plurality of terminals, and the second terminal 160 may be generally one of a plurality of terminals. In this embodiment, only the first terminal 120 and the second terminal 160 are used as an example for description. The first terminal 120 and the second terminal 160 are of the same or different device types. The device type includes at least one of a smartphone, a tablet computer, an e-book reader, a Moving Picture Experts Group Audio Layer III (MP3) player, a Moving Picture Experts Group Audio Layer IV (MP4) player, a laptop, and a desktop computer. The following embodiment is described by using an example that the terminal includes a smartphone.

A person skilled in the art may learn that there may be more or fewer terminals. For example, there may be only one terminal, or there may be dozens of or hundreds of terminals or more. The quantity and the device type of the terminals are not limited in the embodiments of this application.

FIG. 3 is a flowchart of a data packet synchronization method according to an embodiment of this application. This embodiment is described by using an example in which the method is applied to the server 140 in the computer system 100 shown in FIG. 1, and k logical threads and k message queues are set on the server 140, k being a positive integer. The logical threads correspond one to one to the message queues. The logical threads are categorized according to a logical operation type. The method includes the following steps:

Step 301: Receive a data packet transmitted by a client, the data packet including a thread identifier and a frame identifier, the thread identifier being added by the client according to a logical operation type required by the data packet, the frame identifier being used for identifying a picture frame triggering the data packet.

Various clients are run on a terminal. The clients are clients that transmit data packets to a server.

For example, the clients are game clients. When a user performs some operations on a game client, the game client generates a data packet according to the operations of the user and transmits the data packet to the server. It may be understood that the server is connected to a plurality of game clients. The plurality of game clients can all transmit data packets to the server.

For example, a data packet includes at least one of control data generated from an operation of a user, data corresponding to a change in an attribute of a virtual object, data corresponding to an object on which the operation acts (for example, an object being aimed at or attacked), data of an animation special effect, or data of a change in a virtual environment picture. The client adds a thread identifier to a data packet according to a type of a logical operation that needs to be performed on data in the data packet. For example, the type of the logical operation includes at least one of a skill logical operation, an attribute logical operation, a position logical operation, an operation logical operation, or an animation effect logical operation.

For example, the data packet generated by the client includes various data. Different types of data require different types of logical threads for logical operations. In the embodiments of this application, for example, data in one data packet is data of the same type, that is, requires the same type of logical operation. The thread identifier is a serial number of a thread. For example, thread identifiers are a thread 1, a thread 2, . . . , and a thread k, k being a positive integer.

For example, the client generates a data packet according to each picture frame. The data packet includes a frame identifier of the picture frame. The frame identifier is used for distinguishing different picture frames. The frame identifier is an identifier that the picture frame has in an arrangement in a time order. For example, the frame identifier is a sequence number of a frame. For example, frame identifiers are a frame 1 (the first frame), a frame 2 (the second frame), . . . , a frame j (a $j^{th}$ frame), j being a positive integer.

Step 302: Write, after the data packet is transmitted to a logical thread corresponding to the thread identifier for a logical operation, a data packet obtained after the operation into a message queue corresponding to the logical thread.

When receiving a data packet, the server needs to perform a logical operation according to data in the data packet. For example, the data in the data packet is data about a user controlling a virtual object (a virtual object controlled by the user in a game) to cast a skill. The server needs to perform a skill type logical operation on the data packet, that is, perform a skill type logical operation on the data packet by using a skill type logical thread. Therefore, the data packet includes a thread identifier about the skill type logical thread.

Because a corresponding message queue is assigned to each logical thread, the logical thread directly writes a data packet obtained after a logical operation into a message queue corresponding to the logical thread.

Figure 4:
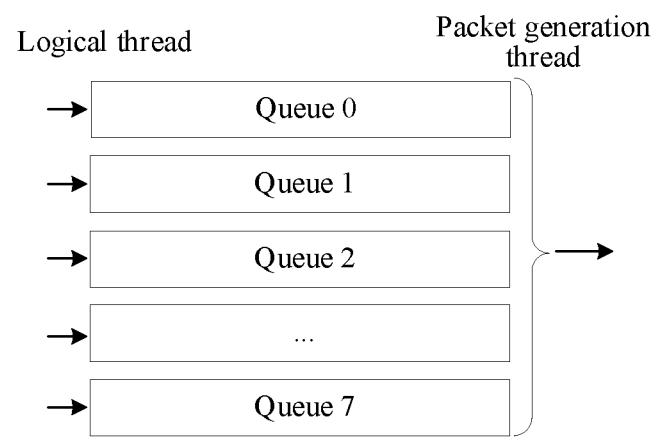
FIG. 4 is a schematic framework diagram of a data packet synchronization method according to an embodiment of this application.

FIG. 4 shows seven logical threads and seven message queues. A plurality of arrows on the left side represent a plurality of logical threads (the arrows are only schematic but do not represent an actual quantity of logical threads). Data packets in the seven logical threads are respectively written into the seven message queues.

In some embodiments, the server further includes a message queue for receiving a data packet. The message queue is used for receiving a data packet transmitted by a client. Each logical thread reads a corresponding data packet from the message queue according to a thread identifier carried in the data packet.

It may be understood that one client may transmit one or more data packets. When the client transmits a plurality of data packets, logical operation types required by the plurality of data packets may be the same or different. Data packets transmitted by one client may be assigned to various logical threads. The various logical threads may have a data packet transmitted by each client.

Step 303: Read the data packet obtained after the operation from the message queue according to the frame identifier, and synchronize the data packet obtained after the operation to a client associated with the client.

The data packet obtained after the operation is read from the message queue according to a timestamp sequence corresponding to the frame identifier, and the data packet obtained after the operation is synchronized to at least one associated client. When the server reads a data packet from a message queue, to prevent the order of picture frames corresponding to data packets received by a client from getting confused, the server reads data packets from the message queue frame by frame. The data packets are generated according to a timestamp sequence corresponding to pictures, that is, a chronological order. Therefore, frame identifiers carried in the data packets are also arranged in the timestamp sequence.

For example, the server reads data packets from the message queue frame by frame, that is, completes the reading of data packets corresponding to the first picture frame before reading data packets corresponding to the second picture frame. The second picture frame is generated later than the first picture frame. The server performs logical operations on data packets corresponding to each picture frame, and transmits data packets obtained after the operations to an associated client. The associated client processes the data packets obtained after the operations to obtain the corresponding picture frame.

It may be understood that because message queues correspond one to one to logical threads, data packets corresponding to one picture frame may be scattered in the message queues. When reading data packets corresponding to one picture frame, the server needs to finish reading all data packets corresponding to the picture frame in each message queue. After the reading of the data packets corresponding to the picture frame in all the message queues is completed, the reading of the data packets corresponding to the picture frame is completed. The server synchronously transmits the read data packets to at least one associated client.

In some embodiments, as shown in FIG. 4, the server further includes a packet generation thread. The packet generation thread is a single thread, to ensure that data of an application programming interface (API) for invoking and transmitting data packets is secure.

An associated client is a client that has an association relationship with a client that transmits a data packet. For example, the client that transmits a data packet and the associated client are clients that participate in the same round of game. In some embodiments, a user account into which the client that transmits a data packet has logged and a user account into which the associated client has logged have a friend relationship. The user account into which the client that transmits a data packet has logged and the user account into which the associated client has logged are in the same temporary chat message or in the same group chat.

In summary, in the method provided in this embodiment, corresponding message queues are assigned to logical threads categorized according to a logical operation type, to allow a user to write a data packet obtained after a logical thread operation into a message queue corresponding to each logical thread, to avoid a write conflict of data packets when a plurality of logical threads share one message queue. In addition, a quantity of message queues is reduced to reduce internal memory of the server occupied by message queues, thereby reducing the cost of message management.

Figure 5:
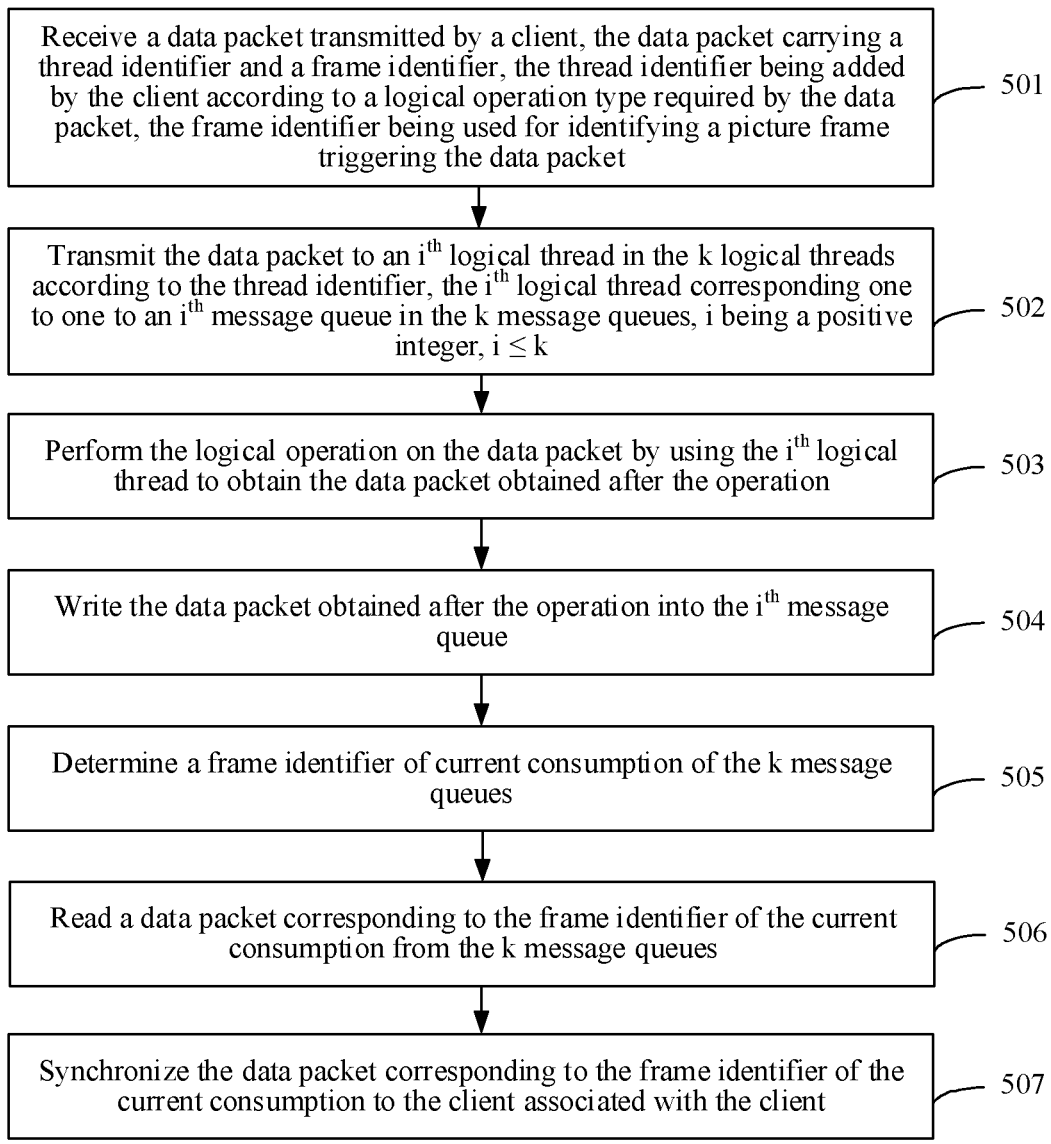
FIG. 5 is a flowchart of a data packet synchronization method according to another embodiment of this application.

FIG. 5 is a flowchart of a data packet synchronization method according to another embodiment of this application. This embodiment is described by using an example in which the method is applied to the server 140 in the computer system 100 shown in FIG. 1, and k logical threads and k message queues are set on the server 140, k being a positive integer. The logical threads correspond one to one to the message queues. The logical threads are categorized according to a logical operation type. The method includes the following steps:

Step 501: Receive a data packet transmitted by a client, the data packet including a thread identifier and a frame identifier, the thread identifier being added by the client according to a logical operation type required by the data packet, the frame identifier being used for identifying a picture frame triggering the data packet.

Step 502: Transmit the data packet to an $i^{th}$ logical thread in the k logical threads according to the thread identifier, the $i^{th}$ logical thread corresponding one to one to an $i^{th}$ message queue in the k message queues, i being a positive integer, i≤k.

The server assigns a data packet to a corresponding logical thread according to a thread identifier in the data packet. For example, a data packet includes a thread identifier of the $i^{th}$ logical thread, the server assigns the data packet to the $i^{th}$ logical thread. It may be understood that one client may transmit one or more data packets. When the client transmits a plurality of data packets, logical operation types required by the plurality of data packets may be the same or different. Data packets transmitted by one client may be assigned to various logical threads. The various logical threads may have a data packet transmitted by each client.

In some embodiments, the server further includes a message queue for receiving a data packet. The message queue is used for receiving a data packet transmitted by a client. Each logical thread reads a corresponding data packet from the message queue according to a thread identifier.

Step 503: Perform the logical operation on the data packet by using the $i^{th}$ logical thread to obtain the data packet obtained after the operation.

For example, a game client is used as an example. A data packet transmitted by the game client to the server includes operation data. The operation data is used for recording an operation of a user in the game client. For example, the operation data is data about a user controlling a virtual object to cast a skill. The data packet is assigned to the $i^{th}$ logical thread. The $i^{th}$ logical thread performs a logical operation according to data in the data packet. For example, a logical operation performed by the $i^{th}$ logical thread is about an effect range and an effect result after a virtual object casts a skill (whether the health points of a virtual object under the action of the skill are reduced and how many health points are reduced). The logical thread generates a data packet obtained after the operation by using data corresponding to the effect range and the effect result after the skill is cast.

Step 504: Write the data packet obtained after the operation into the $i^{th}$ message queue.

Because message queues correspond one to one to logical threads, in the $i^{th}$ message queue corresponding to the $i^{th}$ logical thread, the server writes the data packet obtained after the operation into the $i^{th}$ message queue corresponding to the $i^{th}$ logical thread. It may be understood that one message queue may include one or more data packets transmitted by a target client. One message queue may include one data packet or a plurality of data packets corresponding to one picture frame.

Step 505: Determine a frame identifier of current consumption of the k message queues.

For example, a consumption rule of a message queue is set on the server. The consumption rule specifies the $i^{th}$ message queue as a reference. A frame identifier that a data packet of current consumption of the $i^{th}$ message queue is a frame identifier that data packets of current consumption of all message queues need to have, i being a positive integer, and i≤k. For example, the server includes eight message queues, that is, a first message queue, a second message queue, . . . , and an eighth message queue. The consumption rule specifies the first message queue as a reference. A frame identifier that a data packet of current consumption of the first message is the frame identifier that data packets of current consumption of all message queues need to have. The frame identifier that the data packet of the current consumption of the first message is a frame identifier (the frame 1) corresponding to the first picture frame. The frame identifier of the current consumption is the frame 1. The remaining message queues also need to consume data packets with the frame identifier being the frame 1.

Step 506: Read a data packet corresponding to the frame identifier of the current consumption from the k message queues.

For example, according to the foregoing consumption rule, the server reads the data packets with the frame identifier being the frame 1 from the k message queues.

Step 507: Synchronize the data packet corresponding to the frame identifier of the current consumption to the client associated with the client.

For example, as shown in FIG. 4, the server further includes a packet generation thread (shown by an arrow on the right side). The packet generation thread is a single thread. The server transmits the data packet corresponding to the frame identifier of the current consumption to the packet generation thread. The data packet corresponding to the frame identifier of the current consumption is synchronized to the at least one associated client by using the packet generation thread. In some embodiments, the packet generation thread actively reads data packets from a message queue, and synchronizes the read data packets to associated clients.

Figure 6:
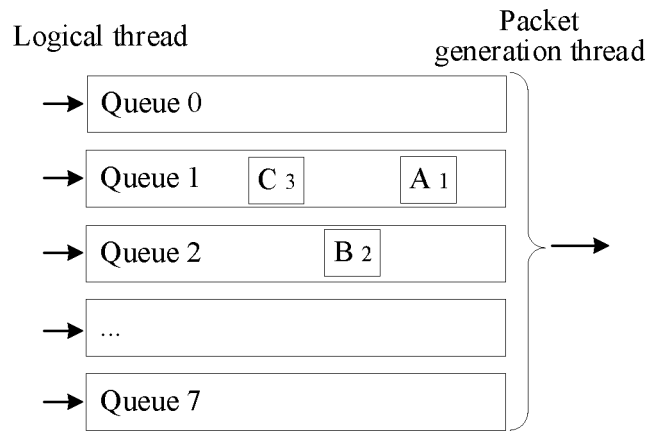
FIG. 6 is a schematic framework diagram of a data packet synchronization method according to another embodiment of this application.

As shown in FIG. 6, a data packet A1 and a data packet C3 are written into a message queue 1. A data packet B2 is written into a message queue 2. A write sequence is: the data packet A1—the data packet B2—the data packet C3. For example, the data packet A1, the data packet C3, and the data packet B2 respectively belong to different picture frames. A packet generation sequence of the packet generation thread is: the data packet A1—the data packet B2—the data packet C3.

In summary, in the method provided in this embodiment, corresponding message queues are assigned according to logical threads for processing data packets, and when the data packets are written into a message queue corresponding to each logical thread, the method avoids write conflicts when a plurality of logical threads share one message queue. In addition, a quantity of message queues is reduced to reduce internal memory of the server occupied by message queues, thereby reducing the cost of message management.

Thread identifiers carried in the data packets are used to determine the logical threads for processing the data packets, thereby ensuring that the problem of a timing sequence error does not occur when the data packets obtained after the operation are subsequently written into the message queues.

Frame identifiers of current consumption of message queues are determined, so that all the message queues generally read data packets corresponding to picture frames having the same frame identifier, thereby ensuring that even if data packets of the same frame are not in the same message queue, the phenomenon of transmitting a data packet across frames does not occur, to avoid a timing sequence error when the client receives the data packets.

In one embodiment based on FIG. 5, the method for reading data packets from message queues includes the following two methods.

1. The reading of data packets corresponding to the same picture frame in one message queue is completed, and then data packets of the picture frame in a next message queue are read. This process is repeated until data packets corresponding to the picture frame in all the message queues have been read.

Figure 7:
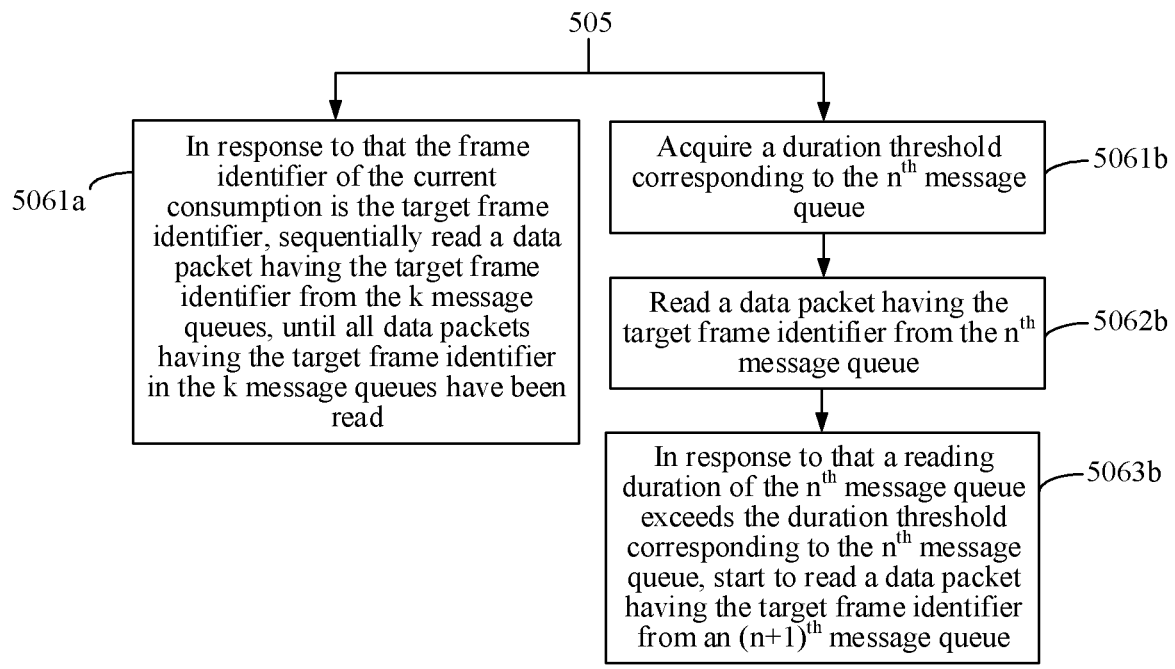
FIG. 7 is a flowchart of a data packet synchronization method according to another embodiment of this application.

The foregoing step 506 may be replaced with the following steps, as shown in FIG. 7.

Step 5061a: In response to that the frame identifier of the current consumption is the target frame identifier, sequentially read a data packet having the target frame identifier from the k message queues, until all data packets having the target frame identifier in the k message queues have been read.

To prevent data packets corresponding to the same picture frame from being transmitted across frames, the server separately inserts cyclic barriers in the k message queues. For example, a frame identifier corresponding to the picture frame is used as a cyclic barrier. For example, a target frame identifier of a $i^{th}$ picture frame is inserted in the k message queues. The target frame identifier is used as a cyclic barrier, j being a positive integer.

For example, the target frame identifier is a frame identifier (a frame 3) of the third picture frame. The server reads the data packets with the frame identifier being the frame 3 from the first message queue.

Figure 8:
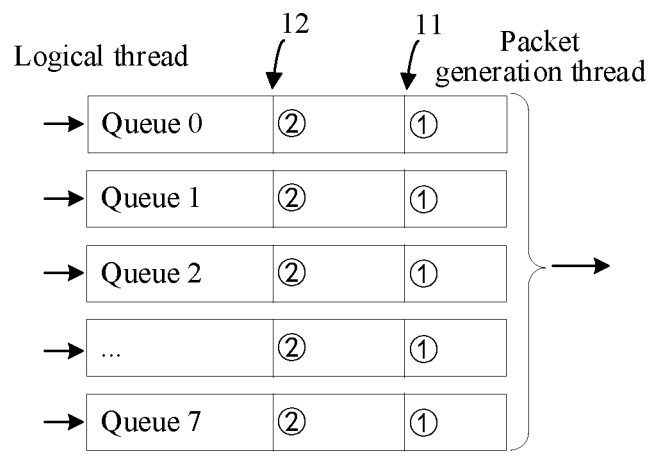
FIG. 8 is a schematic framework diagram of a data packet synchronization method according to another embodiment of this application.

For example, after data packets corresponding to the third picture frame in the first message queue have been read, data packets corresponding to the third picture frame are read from the second message queue. As shown in FIG. 8, a cyclic barrier 11 and a cyclic barrier 12 are inserted in the message queues. For example, the cyclic barrier 11 is used for reading data packets corresponding to the first picture frame from the message queues. The cyclic barrier 12 is used for reading data packets corresponding to the second picture frame from the message queues. After the reading of the data packets corresponding to the first picture frame in all the message queues is completed, data packets corresponding to the second picture frame in the message queues are read. The positions of the cyclic barriers shown in FIG. 8 are only schematic. In each message queue, the position of the cyclic barrier corresponding to the same picture frame in the message queue may be the same or different. The position depends on a quantity of data packets belonging to the same picture frame in the message queue.

The sequential reading from the k message queues may be: when the data packets corresponding to the third picture frame in the first message queue have been read, data packets corresponding to the third picture frame are read from the second message queue; when the data packets corresponding to the third picture frame in the second message queue have been read, data packets corresponding to the third picture frame are read from the third message queue; and this process is repeated until data packets corresponding to the third picture frame in all the message queues have been read.

2. Some data packets corresponding to the same picture frame are read from one message queue. When some data packets have been read, some data packets corresponding to the picture frame are read from a next message queue. This process is repeated until data packets corresponding to the picture frame in all the message queues have been read.

The foregoing step 506 may be: reading the data packet corresponding to the frame identifier of the current consumption from the k message queues according to the duration thresholds respectively corresponding to the k message queues.

For an $n^{th}$ message queue in the k message queues, the reading includes:

the following steps in place of the step, as shown in FIG. 7:

Step 5061b: Acquire a duration threshold corresponding to the $n^{th}$ message queue.

To prevent data packets corresponding to the same picture frame from being transmitted across frames, the server separately inserts cyclic barriers in the k message queues. For example, a frame identifier corresponding to the picture frame is used as a cyclic barrier. For example, a target frame identifier of a $i^{th}$ picture frame is inserted in the k message queues. The target frame identifier is used as a cyclic barrier, j being a positive integer.

In addition, when the server reads data packets from one message queue, the other message queues remain in a waiting state, especially the last message queue. The reading of the data packets in all the message queues in front needs to be completed before data packets in the message queue can be read. The server also keeps writing data packets in the logical threads into the message queue, which tends to cause a congestion in the message queues. Therefore, the server sets a duration threshold for a message queue, and the k message queues respectively correspond to respective duration thresholds. The duration thresholds corresponding to the message queues may be equal or not equal.

The duration threshold is obtained by using a consumption duration corresponding to the message queue. The consumption duration is an estimated duration of reading a data packet corresponding to one picture frame from the message queue. For example, the server estimates, according to a quantity of data packets with the same frame identifier in a message queue, a duration required for the message queue to consume the data packets of the frame, to obtain a consumption duration, so that the server categorizes the consumption duration to obtain a duration threshold. For example, consumption durations corresponding to the same message queue may be equal or not equal. A plurality of duration thresholds corresponding to the same message queue may be equal or not equal. Consumption durations corresponding to different message queues may be equal or not equal. Duration thresholds corresponding to different message queues may be equal or not equal.

Figure 9:
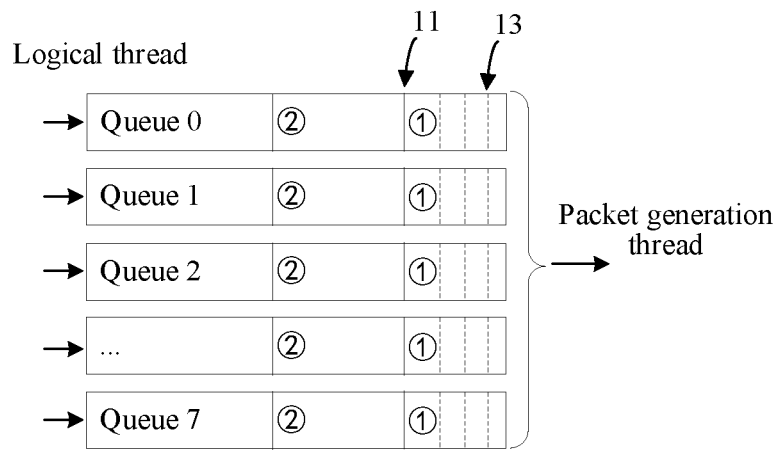
FIG. 9 is a schematic framework diagram of a data packet synchronization method according to another embodiment of this application.

As shown in FIG. 9, the duration threshold of each message queue is represented by a time slice 13 (the dash line in FIG. 9) obtained after division. That is, consumption durations of message queues consuming data packets corresponding to the same picture frame are divided. The time slice is also referred to as a "quantum" or a "processor slice", which is a microscopic central processing unit (CPU) time allocated by a time-division operating system to each running thread. The time slices 13 obtained after division may be equally divided or unequally divided. The positions of the time slices 13 in FIG. 9 are only schematic.

For example, the duration threshold corresponding to the $n^{th}$ message queue is 100 seconds.

Step 5062b: Read a data packet having the target frame identifier from the $n^{th}$ message queue.

The server reads a data packet having the target frame identifier from the $n^{th}$ message queue within the duration threshold. For example, a duration threshold corresponding to the third message queue is 100 seconds. The server reads data packets corresponding to the third picture frame in the third message queue within 100 seconds.

Step 5063b: In response to that a reading duration of the $n^{th}$ message queue exceeds the duration threshold corresponding to the $n^{th}$ message queue, start to read a data packet having the target frame identifier from an $(n+1)^{th}$ message queue.

For example, a countdown is performed during the reading of data packets in a message queue. For example, when the server starts to read the data packets corresponding to the third picture frame in the third message queue and starts a countdown of 100 seconds. When the countdown of 100 seconds ends, the server stops reading the data packets corresponding to the third picture frame in the third message queue, and starts to read data packets corresponding to the third picture frame from the fourth message queue.

For example, a count is performed during the reading of data packets in a message queue. For example, when the server starts to read the data packets corresponding to the third picture frame in the third message queue and starts a timer. When the count of the timer exceeds (or is equal to) 100 seconds, the server stops reading the data packets corresponding to the third picture frame in the third message queue, and starts to read the data packets corresponding to the third picture frame from the fourth message queue.

For example, duration thresholds corresponding to each message queue are equal and are all 100 seconds. Data packets corresponding to the third picture frame in the first message queue are read within 100 seconds. Next, a count of 100 seconds is performed again. Data packets corresponding to the third picture frame are read from the second message queue within 100 seconds. Next, a count of 100 seconds is performed again. Data packets corresponding to the third picture frame are read from the third message queue within 100 seconds. This process is repeated. After an operation of reading data packets within 100 seconds is performed in a $k^{th}$ message queue, reading is started again from the first message queue. It is first determined whether the first message queue still has data packets corresponding to the third picture frame. If the first message queue has data packets corresponding to the third picture frame, the data packets corresponding to the third picture frame continue to be read according to the duration threshold. If the first message queue does not have data packets corresponding to the third picture frame, data packets corresponding to the third picture frame are read from the second message queue. Similarly, it needs to be determined whether the second message queue still has data packets corresponding to the third picture frame. This process is repeated, until the data packets corresponding to the third picture frame in all the message queues have been read.

In summary, in the method provided in this embodiment, a frame identifier is used as a cyclic barrier, so that when a server reads data packets belonging to the same picture frame in message queues, and reading of data packets corresponding to one picture frame needs to be completed before data packets corresponding to a next picture frame can be read, thereby avoiding transmission of data packets across frames.

The consumption durations corresponding to the message queues are divided, so that each time the server only reads some data packets belonging to the same picture frame in each message queue, to prevent a message queue near the end from waiting an excessively long time, thereby avoiding a phenomenon of a congestion because data packets are continuously written into the message queues.

Based on the foregoing packet generation mechanism, some data packets carry a relatively large amount of data. As a result, when a client receives the data packets, a relatively large amount of resources needs to be consumed to load the data packets. A game client is used as an example. A terminal used by a user is a smartphone. When playing an MMORPG game on the smartphone, the user needs to use a network, for example, a Wireless Fidelity (Wi-Fi) network or a mobile communication network (network traffic provided by a network operator) in wireless networks. A mobile communication network is used as an example. If a data packet includes a relatively large amount of data, a larger amount of network traffic needs to be consumed. Therefore, to avoid consuming a relatively large amount of network traffic, data included in data packets is filtered.

For example, a client is limited by a field of view. For virtual objects in the field of view, models are displayed for only some virtual objects. For example, there are 80 virtual objects in the field of view. The user can only see complete models of 10 virtual objects, and only nicknames (or user accounts) are displayed for the remaining 70 virtual objects. The client displays the nicknames and health points of the 70 virtual objects but does not display special effects. Since special effects are not displayed, data packets related to skills of the virtual objects do not need to be transmitted to the associated clients.

Figure 10:
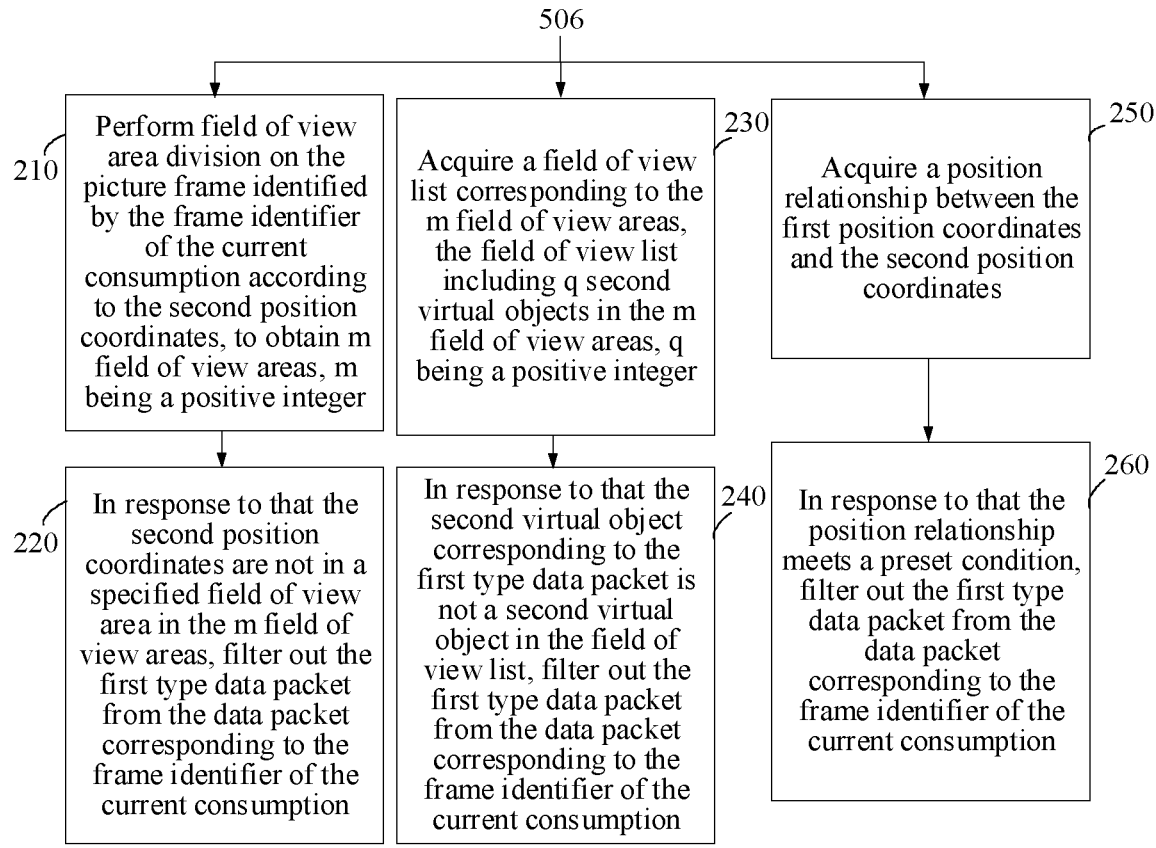
FIG. 10 is a flowchart of a data packet synchronization method according to another embodiment of this application.

In one embodiment based on FIG. 5, a filtering mode of data packets is three-level filtering. The filtering mode includes the following steps, as shown in FIG. 10.

1. First-Level Filtering

Step 210: Perform field of view area division on the picture frame identified by the frame identifier of the current consumption according to the second position coordinates, to obtain m field of view areas, m being a positive integer.

The server stores first position coordinates of a first virtual object controlled by the client. The data packet corresponding to the frame identifier of the current consumption includes a first type data packet. The first type data packet includes second position coordinates of a second virtual object in a picture frame. For example, the first type data packet is a combat packet. The combat packet includes data about a virtual object casting a skill, data about the virtual object participating in a battle, data about changing a skill or changing a weapon, and the like.

Step 220: In response to that the second position coordinates are not in a specified field of view area in the m field of view areas, filter out the first type data packet from the data packet corresponding to the frame identifier of the current consumption.

Figure 11:
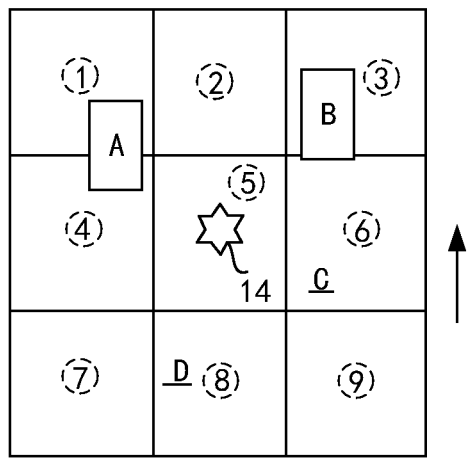
FIG. 11 is a schematic framework diagram of m field of view areas according to an embodiment of this application.

For example, the position coordinates of the second virtual object are not in the m field of view areas, and the first type data packet is filtered out from the data packet corresponding to the frame identifier of the current consumption. That is, the server transmits data packets corresponding to virtual objects in the m field of view areas to the client controlling the first virtual object. As shown in FIG. 11, the value of m is 9. The field of view of a first virtual object 14 includes four virtual objects A, B, C, and D. The server transmits data packets corresponding to the virtual object A, the virtual object B, the virtual object C, and the virtual object D to a client controlling the first virtual object 14. The client displays the virtual object A, the virtual object B, the virtual object C, and the virtual object D. A nine-square grid is not displayed on the client.

In another example, the position coordinates of the second virtual object are not in the first square, that is, a square corresponding to a sequence number 1 shown in FIG. 11, in the nine-square grid. The server transmits data packets corresponding to other virtual objects in the first square to the client of the first virtual object 14.

2. Second-Level Filtering

Step 230: Acquire a field of view list corresponding to the m field of view areas, the field of view list including q second virtual objects in the m field of view areas, q being a positive integer.

A plurality of virtual objects may be present in the m field of view areas. However, all the plurality of virtual objects present in the m field of view areas are not displayed on the client. A field of view list is used to set an upper quantity limit for virtual objects present in the m field of view areas. When there are excessive virtual objects in the field of view, a preset upper quantity limit may be used to limit a quantity of second virtual objects to be acquired.

Step 240: In response to that the second virtual object corresponding to the first type data packet is not a second virtual object in the field of view list, filter out the first type data packet from the data packet corresponding to the frame identifier of the current consumption.

For example, m is 9. When a second virtual object enters the nine-square grid field of view and the second virtual object enters the field of view list, a quantity of second virtual objects exceeds the quantity specified in the field of view list, the server filters out the first type data packet from the data packet corresponding to the frame identifier of the current consumption. That is, the data packet corresponding to the second virtual object is filtered out, and the client controlling the first virtual object does not display the second virtual object.

3. Third-Level Filtering

Step 250: Acquire a position relationship between the first position coordinates and the second position coordinates.

Step 260: In response to that the position relationship meets a preset condition, filter out the first type data packet from the data packet corresponding to the frame identifier of the current consumption.

For example, the preset condition includes at least one of the following conditions:
  a distance between the first virtual object and the second virtual object is greater than a distance threshold; or
  the second virtual object is outside a field of view of the first virtual object.

As shown in FIG. 11, for the first virtual object 14, a facing direction of the first virtual object 14 is a direction to which the arrow points. The virtual object A and the virtual object B are located in front of the first virtual object. The virtual object C and the virtual object D are located behind the first virtual object 14. For example, the virtual object D is a second virtual object. The distance between the virtual object D and the first virtual object 14 is greater than the distance threshold. In this case, the first type data packet is filtered out from the data packet corresponding to the frame identifier of the current consumption. That is, the client corresponding to the first virtual object 14 does not display the virtual object D. For example, the virtual object C is a second virtual object. The virtual object C is located outside the field of view of the first virtual object 14. In this case, the first type data packet is filtered out from the data packet corresponding to the frame identifier of the current consumption. That is, the client corresponding to the first virtual object 14 does not display the virtual object D. For example, for the virtual object C and the virtual object D, the models and names of the virtual object C and the virtual object D are not displayed on the client corresponding to the first virtual object 14, and activities of interaction (for example, mutual attacks) between the virtual object C and the virtual object D are not displayed on the client either.

Figure 12:
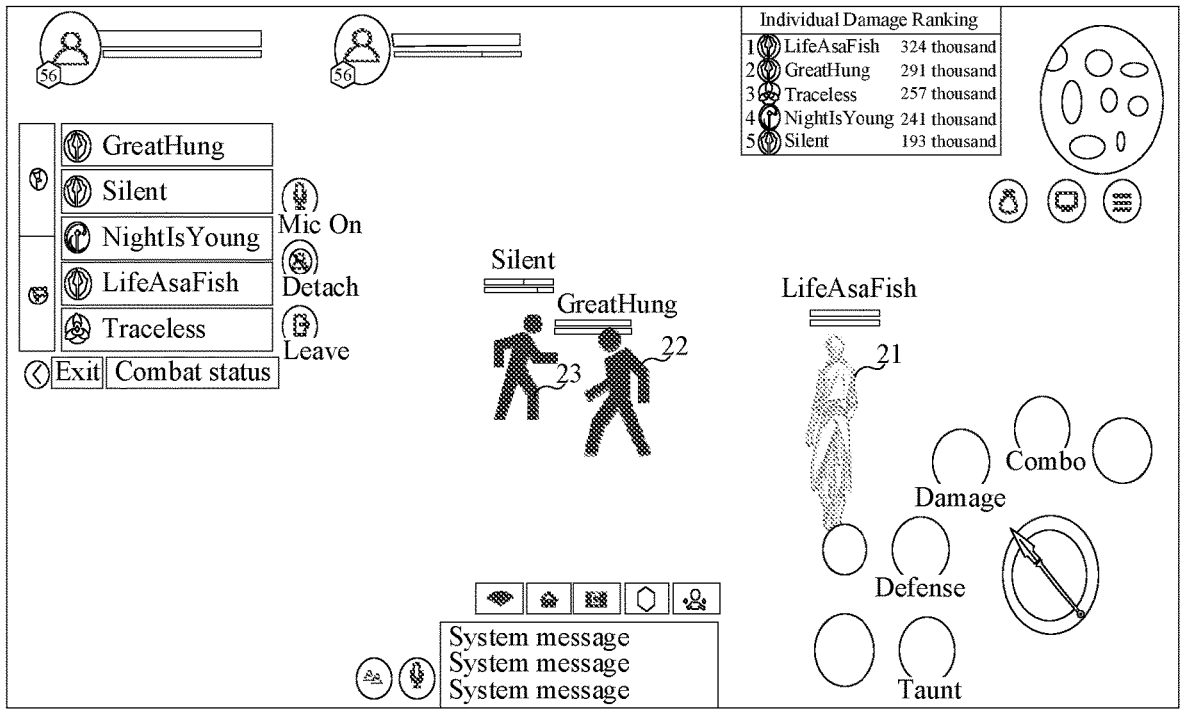
FIG. 12 is a schematic diagram of a screen on a client according to an embodiment of this application.

As shown in FIG. 12, the screen is a display screen triggered after the client receives the data packets with the first type data packet filtered out. A limited quantity of virtual objects are displayed on the screen. The screen is a screen formed by the client controlling the field of view of the first virtual object. For example, a finer image model is displayed for a virtual object 21 closer to the first virtual object, and schematic image models are displayed for a virtual object 22 and a virtual object 23 farther away from the first virtual object, thereby reducing resources that need to be consumed when the client loads data packets.

In summary, in the method provided in this embodiment, a data packet corresponding to a frame identifier of current consumption is filtered to reduce data included in a data packet to be synchronized to an associated client, so that resources consumed by the client when the client loads the data packet obtained after filtering can be reduced.

It may be understood that the three levels of filtering may be separately implemented, or any two of the three levels of filtering may be combined for implementation, or all the three levels of filtering may be implemented.

In some embodiments, a data packet includes some data too important to be filtered out. In this case, the client is instructed to reduce a transmission frequency to reduce resources consumed when the client loads data packets.

For example, the data packet corresponding to the frame identifier of the current consumption further includes a second type data packet, and the second type data packet includes an attribute parameter of a virtual object. An example in which the second type data packet is an attribute data packet is used for description. An attribute parameter includes at least one type of data of health points, energy points, magic points, and attack power of a virtual object.

In response to that the attribute parameter remains unchanged, the client is instructed to reduce the transmission frequency of the second type data packet.

For example, the server sets a dirty flag for an attribute parameter. The dirty flag is used to determine whether the attribute parameter of the virtual object has changed. For example, the dirty flag is checked at intervals of 500 milliseconds. If the dirty flag remains unchanged, it indicates that the second type data packet remains unchanged, and the server does not transmit a second type data packet to the client. If the dirty flag has changed, it indicates that the second type data packet has changed, and the server transmits a second type data packet to the client and sets a dirty flag again for an attribute parameter corresponding to the second type data packet.

In summary, in the method provided in this embodiment, a change in a dirty flag is used to determine whether an attribute parameter has changed, so that when the attribute parameter remains unchanged, a transmission frequency of a second type data packet is reduced, thereby reducing resources that need to be consumed when a client loads a second type data packet.

In some embodiments, for the step of cropping the first type data packet or transmitting the first type data packet with a reduced frequency, filtering may be performed by using a logical thread and then data is written into a message queue, or a message queue may be read, and filtering is performed in a read data packet.

In an example, the overall procedure of the data packet synchronization method includes the following procedures.

A plurality of logical threads are included in a server. The logical threads are used for performing a logical operation according to a data packet transmitted by a client.

Write Process:

For example, a game is used as an example. Each logical thread in the server is used for performing a game logical operation. The server assigns a message queue to each logical thread. Clients participating in the game generate a large number of data packets. For example, the clients transmit data packets corresponding to one frame of virtual environment picture to the server. The server writes data packets corresponding to one frame of virtual environment picture into message queues according to thread identifiers carried in the data packets. When receiving the data packets, the server further records a receiving order of the data packets, and writes the data packets into the message queues according to the receiving order. That is, an order of data packets written into the same message queue is fixed.

Read Process:

The server inserts a frame identifier of each frame of virtual environment picture into the message queues as cyclic barriers. The server specifies one message queue to consume a data packet of a frame. For example, the server specifies the first message queue to consume a data packet corresponding to an $i^{th}$ frame of virtual environment picture, and uses an identifier of the $i^{th}$ frame as a cyclic barrier. Starting from the first message queue, the server reads a data packet corresponding to the $i^{th}$ frame of virtual environment picture, performs a game logical operation according to the data packet, and transmits the data packet obtained after the operation to clients. Next, the server reads the second message queue, performs a game logical operation on a data packet located in front of the cyclic barrier in the second message queue, and transmits a data packet obtained after the operation to the clients. This process is repeated, until data packets corresponding to an $i^{th}$ frame of virtual environment picture in all the message queues have been read.

After the reading of the data packets corresponding to the $i^{th}$ frame of virtual environment picture is completed, data packets corresponding to an $(i+1)^{th}$ frame of virtual environment picture are then read. A method of reading the data packets corresponding to the (i+1)th frame of virtual environment picture is the same as that of reading the data packets corresponding to the $i^{th}$ frame of virtual environment picture.

Based on the foregoing transmission mechanism of data packets, when the server consumes data packets in one message queue, the other message queues are in a waiting state. For the last message queue, the reading of the data packets belonging to the same picture frame in all the message queues in front needs to be completed before data packets in the last message queue can be read. Meanwhile, data packets transmitted by the clients are continuously written into the message queues, which tends to cause a congestion in the message queues.

In some embodiments, the server allocates a time slice to a message queue. The time slice has a corresponding estimated duration for the message queue to consume a data packet of one frame of virtual environment picture. The server divides the time slice of the message queue to obtain at least two time slices obtained after division of one message queue. The durations of the time slices obtained after division may be equal or not equal.

For example, starting from the first message queue, the server reads the data packets corresponding to the $i^{th}$ frame of virtual environment picture according to the durations of the time slices obtained after division. For example, a time slice obtained after division of the first message queue has a duration of 60 seconds, and a time slice obtained after division of the second message queue has a duration of 100 seconds. Starting from the first message queue, the server uses the 60 seconds to read data packets corresponding to the $i^{th}$ frame of virtual environment picture in the first message queue. When the duration of the time slice obtained after division reaches 0, the server uses the 100 seconds to read data packets corresponding to the $i^{th}$ frame of virtual environment picture in the second message queue. Within the 60 seconds, the data packets corresponding to the $i^{th}$ frame of virtual environment picture in the first message queue may be completely read or partially read. Similarly, within the 100 seconds, the data packets corresponding to the $i^{th}$ frame of virtual environment picture in the second message queue may be completely read or partially read.

For example, if the server does not complete reading the data packets corresponding to the $i^{th}$ frame of virtual environment picture in the first message queue within 60 seconds, when traversing to the first message queue again, the server continues to read the $i^{th}$ frame of virtual environment picture.

In the foregoing description, all message queues are cyclically traversed until the $i^{th}$ frame identifier has been read in all the message queues. It indicates that the data packets corresponding to the $i^{th}$ frame of virtual environment picture have been read, and the server uses the foregoing method to read the data packets corresponding to the $(i+1)^{th}$ frame of virtual environment picture.

Through the method provided in this embodiment, a message queue is assigned to each logical thread, so that a quantity of message queues is reduced, and the cost of message management is reduced. A cyclic barrier is inserted in the message queues, thereby avoiding transmission of data packets across frames.

Figure 13:
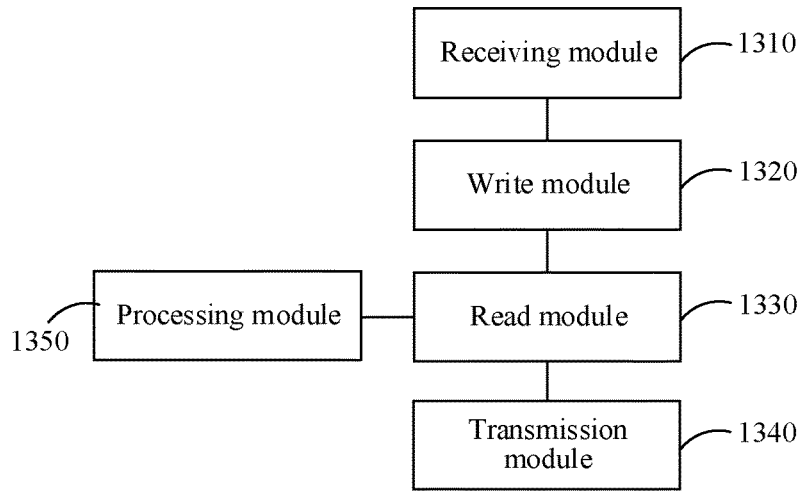
FIG. 13 is a structural block diagram of a data packet synchronization apparatus according to an embodiment of this application.

FIG. 13 is a structural block diagram of a data packet synchronization apparatus according to an embodiment of this application. The apparatus includes:

a receiving module 1310, configured to receive a data packet transmitted by a client, the data packet including a thread identifier and a frame identifier, the thread identifier being added by the client according to a logical operation type required by the data packet, the frame identifier being used for identifying a picture frame triggering the data packet;

a write module 1320, configured to write, after the data packet is transmitted to a logical thread corresponding to the thread identifier for a logical operation, a data packet obtained after the operation into a message queue corresponding to the logical thread; and a read module 1330, configured to read the data packet obtained after the operation from the message queue according to the frame identifier, and synchronize the data packet obtained after the operation to a client associated with the client.

In one embodiment, the apparatus includes a transmission module 1340 and a processing module 1350.

The transmission module 1340 is configured to transmit the data packet to an $i^{th}$ logical thread in the k logical threads according to the thread identifier, the $i^{th}$ logical thread corresponding one to one to an $i^{th}$ message queue in the k message queues, i being a positive integer, i≤k.

The processing module 1350 is configured to perform the logical operation on the data packet by using the $i^{th}$ logical thread to obtain the data packet obtained after the operation.

The write module 1320 is configured to write the data packet obtained after the operation into the $i^{th}$ message queue.

In one embodiment, the processing module 1350 is configured to determine a frame identifier of current consumption of the k message queues;

the read module 1330 is configured to read a data packet corresponding to the frame identifier of the current consumption from the k message queues; and the transmission module 1340 is configured to synchronize the data packet corresponding to the frame identifier of the current consumption to the client associated with the client.

In one embodiment, a data packet corresponding to a target frame identifier is written into the k message queues; and the read module 1330 is configured to: in response to that the frame identifier of the current consumption is the target frame identifier, sequentially read a data packet having the target frame identifier from the k message queues, until all data packets having the target frame identifier in the k message queues have been read.

In one embodiment, a data packet corresponding to a target frame identifier is written into the k message queues, and the k message queues respectively correspond to respective duration thresholds; and the processing module 1350 is configured to read the data packet corresponding to the frame identifier of the current consumption from the k message queues according to the duration thresholds respectively corresponding to the k message queues, and for an $n^{th}$ message queue in the k message queues, the processing module 1350 is configured to: acquire a duration threshold corresponding to the $n^{th}$ message queue, n being a positive integer, n≤k; read a data packet having the target frame identifier from the $n^{th}$ message queue; and in response to that a reading duration of the $n^{th}$ message queue exceeds the duration threshold corresponding to the $n^{th}$ message queue, start to read a data packet having the target frame identifier from an $(n+1)^{th}$ message queue.

In one embodiment, the duration threshold is obtained by using a consumption duration corresponding to the message queue. The consumption duration is an estimated duration of reading a data packet corresponding to one picture frame from the message queue.

In one embodiment, the data packet corresponding to the frame identifier of the current consumption includes a first type data packet, and the first type data packet includes second position coordinates of a second virtual object in a picture frame; and the processing module 1350 is configured to: perform field of view area division on the picture frame identified by the frame identifier of the current consumption according to the second position coordinates, to obtain m field of view areas, m being a positive integer; and in response to that the second position coordinates are not in a specified field of view area in the m field of view areas, filter out the first type data packet from the data packet corresponding to the frame identifier of the current consumption.

In one embodiment, the processing module 1350 is configured to: acquire a field of view list corresponding to the m field of view areas, the field of view list including q second virtual objects in the m field of view areas, q being a positive integer; and in response to that the second virtual object corresponding to the first type data packet is not a second virtual object in the field of view list, filter out the first type data packet from the data packet corresponding to the frame identifier of the current consumption.

In one embodiment, the server stores first position coordinates of a first virtual object controlled by the client, and the processing module 1350 is configured to: acquire a position relationship between the first position coordinates and the second position coordinates; and in response to that the position relationship meets a preset condition, filter out the first type data packet from the data packet corresponding to the frame identifier of the current consumption.

In one embodiment, the preset condition includes at least one of the following conditions:

a distance between the first virtual object and the second virtual object is greater than a distance threshold; or
  the second virtual object is outside a field of view of the first virtual object.

In one embodiment, the data packet corresponding to the frame identifier of the current consumption includes a second type data packet, and the second type data packet includes an attribute parameter of a virtual object; and the processing module 1350 is configured to: in response to that the attribute parameter remains unchanged, instruct the client to reduce the transmission frequency of an attribute data packet.

In one embodiment, the transmission module 1330 is configured to: transmit the data packet corresponding to the frame identifier of the current consumption to a packet generation thread; and synchronize the data packet to the client associated with the client by using the packet generation thread.

In summary, for the apparatus provided in this embodiment, corresponding message queues are assigned to logical threads categorized according to a logical operation type, to allow a user to write a data packet obtained after a logical thread operation into a message queue corresponding to each logical thread, to avoid a write conflict of data packets when a plurality of threads share one message queue. In addition, the quantity of message queues is reduced to reduce internal memory of the server occupied by message queues, thereby reducing the cost of message management.

Thread identifiers carried in the data packets are used to determine the logical threads for processing the data packets, thereby ensuring that the problem of a timing sequence error does not occur when the data packets obtained after the operation are subsequently written into the message queues.

Frame identifiers of current consumption of message queues are determined, so that all the message queues generally read data packets corresponding to picture frames having the same frame identifier, thereby ensuring that even if data packets of the same frame are not in the same message queue, the phenomenon of transmitting a data packet across frames does not occur, to avoid a timing sequence error when the client receives the data packets.

A frame identifier is used as a cyclic barrier, so that when a server reads data packets belonging to the same picture frame in message queues, and reading of data packets corresponding to one picture frame needs to be completed before data packets corresponding to a next picture frame can be read, thereby avoiding transmission of data packets across frames.

The consumption durations corresponding to the message queues are divided, so that each time the server only reads some data packets belonging to the same picture frame in each message queue, to prevent a message queue near the end from waiting an excessively long time, thereby avoiding a phenomenon of a congestion because data packets are written into the message queues.

A data packet corresponding to a frame identifier of current consumption is filtered to reduce data included in a data packet to be synchronized to an associated client, so that resources consumed by the client when the client loads the data packet obtained after filtering can be reduced.

A change in a dirty flag is used to determine whether an attribute parameter has changed, so that when the attribute parameter remains unchanged, a transmission frequency of a second type data packet is reduced, thereby reducing resources that need to be consumed when a client loads a second type data packet.

For the foregoing data packet synchronization apparatus provided in the embodiments, only division of the foregoing functional modules is used as an example for description. In implementations, the functions may be allocated to and completed by different function modules according to requirements. That is, an internal structure of the device is divided into different functional modules, to complete all or some of the functions described above. In addition, the data packet synchronization apparatus provided in the foregoing embodiment belongs to the same conception as the embodiment of the data packet synchronization method. For a specific implementation process thereof, reference may be made to the method embodiment. Details are not described herein again.

Figure 14:
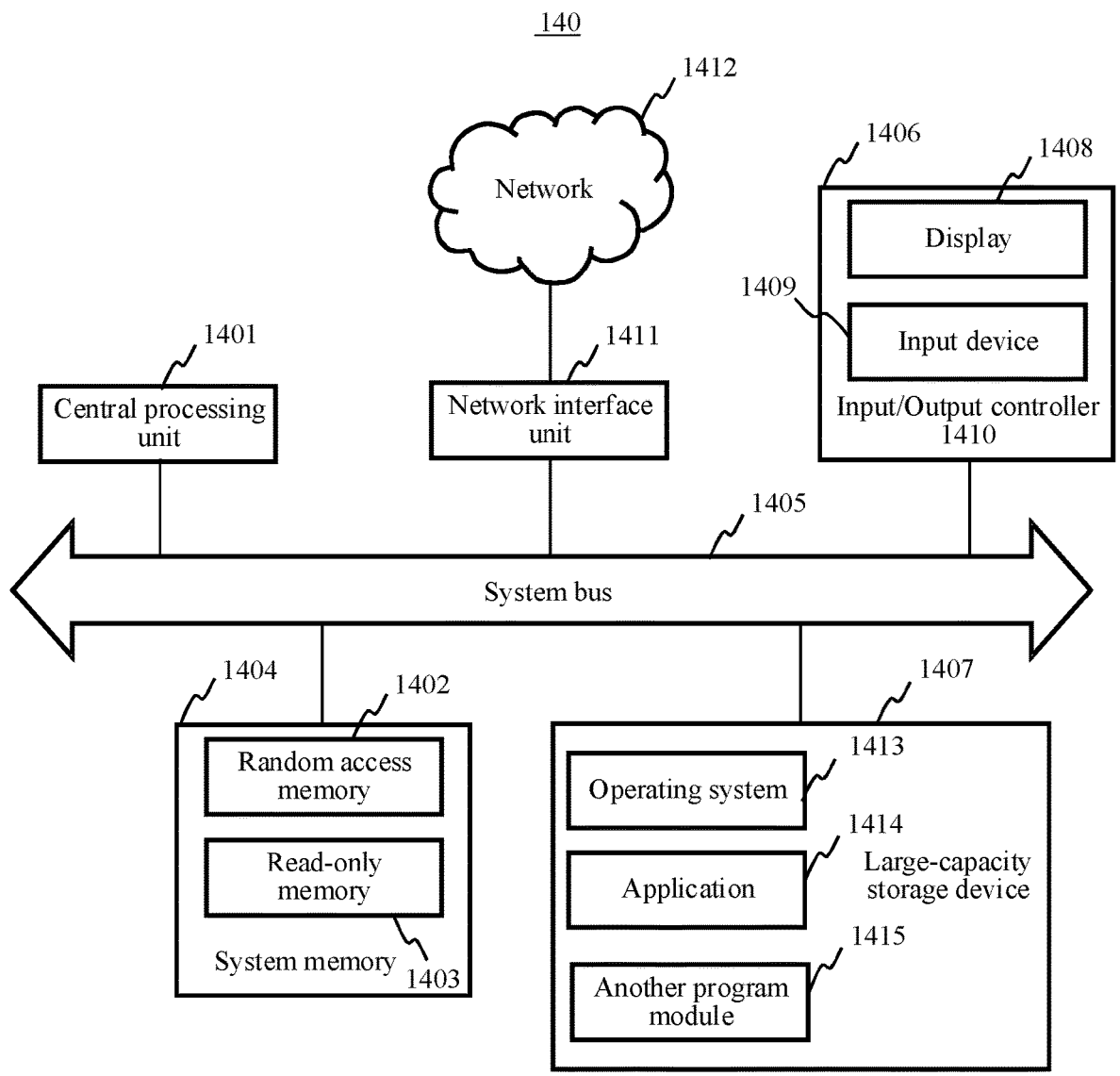
FIG. 14 is a schematic structural diagram of a server according to an embodiment of this application.

FIG. 14 is a schematic structural diagram of a server according to an embodiment of this application. The server may be the server 140 in the computer system 100 shown in FIG. 1.

The server 140 includes a central processing unit (CPU) 1401, a system memory 1404 including a random access memory (RAM) 1402 and a read-only memory (ROM) 1403, and a system bus 1405 connecting the system memory 1404 and the CPU 1401. The server 140 further includes a basic input/output (I/O) system 1406 assisting in transmitting information between components in the computer, and a mass storage device 1407 configured to store an operating system 1413, an application 1414, and another program module 1415.

The basic I/O system 1406 includes a display 1408 configured to display information and an input device 1409 such as a mouse or a keyboard that is used for inputting information by a user. The display 1408 and the input device 1409 are both connected to the CPU 1401 by using an input/output controller 1410 connected to the system bus 1405. The basic I/O system 1406 may further include the input/output controller 1410 to be configured to receive and process inputs from a plurality of other devices such as a keyboard, a mouse, and an electronic stylus. Similarly, the input/output controller 1410 further provides an output to a display screen, a printer, or another type of output device.

The mass storage device 1407 is connected to the CPU 1401 by using a mass storage controller (not shown) connected to the system bus 1405. The mass storage device 1407 and a computer-readable medium associated with the large-capacity storage device provide non-volatile storage to the server 140. That is, the mass storage device 1407 may include the computer-readable medium (not shown) such as a hard disk or a Compact Disc Read-Only Memory (CD-ROM) drive.

The computer-readable medium may include a computer storage medium and a communication medium. The computer storage medium includes volatile and non-volatile media, and removable and non-removable media implemented by using any method or technology used for storing information such as computer-readable instructions, data structures, program modules, or other data. The computer storage medium includes a RAM, a ROM, an erasable programmable ROM (EPROM), an electrically erasable programmable ROM (EEPROM), a flash memory or another solid-state memory technology, a CD-ROM, a digital versatile disc (DVD) or a solid state drive (SSD), another optical storage, a magnetic cassette, a magnetic tape, a magnetic disk memory, or another magnetic storage device. The RAM may include a resistance random access memory (ReRAM) and a dynamic random access memory (DRAM). Certainly, a person skilled in art can know that the computer storage medium is not limited to the foregoing several types. The system memory 1404 and the mass storage device 1407 may be collectively referred to as a memory.

According to the embodiments of this application, the server 140 may further be connected, through a network such as the Internet, to a remote computer on the network and run. That is, the server 140 may be connected to a network 1412 by using a network interface unit 1411 connected to the system bus 1405, or may be connected to another type of network or a remote computer system (not shown) by using a network interface unit 1411.

The memory further includes one or more programs. The one or more programs are stored in the memory and configured to be executed by the CPU.

In one embodiment, a computer device is provided. The computer device includes a processor and a memory. The memory stores at least one instruction, at least one program, a code set or an instruction set. The at least one instruction, the at least one program, the code set, or the instruction set is loaded or executed by the processor to implement the data packet synchronization method in the foregoing aspects.

In one embodiment, a computer-readable storage medium is provided. The storage medium stores at least one instruction, at least one program, a code set or an instruction set. The at least one instruction, the at least one program, the code set, or the instruction set is loaded or executed by the processor to implement the data packet synchronization method in the foregoing aspects.

In some embodiments, the computer-readable storage medium may include: a read-only memory (ROM), a random access memory (RAM), a solid state drive (SSD), an optical disc, or the like. The RAM may include a resistance random access memory (ReRAM) and a dynamic random access memory (DRAM). The sequence numbers of the foregoing embodiments of this application are merely for description purpose but do not imply the preference among the embodiments.

An embodiment of this application further provides a computer program product or a computer program. The computer program product or the computer program includes computer instructions, and the computer instructions are stored in a computer-readable storage medium. The processor of the computer device reads the computer instructions from the computer-readable storage medium, and the processor executes the computer instructions, to cause the computer device to perform the foregoing data packet synchronization method.

A person of ordinary skill in the art may understand that all or some of the steps implementing the methods in the foregoing embodiments may be implemented by hardware or a program instructing relevant hardware. The program may be stored in a computer-readable storage medium. The above-mentioned storage medium may be a read-only memory (ROM), a magnetic disk, an optical disk, or the like.

The foregoing descriptions are merely embodiments of this application, but are not intended to limit this application. Any modification, equivalent replacement, or improvement made within the spirit and principle of this application shall fall within the protection scope of this application.

What is claimed is:

1. A data packet synchronization method, the method being performed by a server with k logical threads and k message queues, k being a positive integer, the logical threads being categorized according to a logical operation type, the method comprising:

receiving a data packet transmitted by a client, the data packet including a thread identifier and a frame identifier, the thread identifier being added by the client according to a logical operation type of a logical operation required to be performed on data in the data packet, the frame identifier being used for identifying a picture frame triggering the data packet, wherein the logical operation type includes at least one of a skill logical operation, an attribute logical operation, a position logical operation, a user operation logical operation, or an animation effect logical operation, and wherein data in a same data packet requires a same type of logical operation;

writing, after the data packet is transmitted to a logical thread corresponding to the thread identifier for a logical operation of the corresponding logical operation type, a data packet obtained after the logical operation into a message queue corresponding to the logical thread, wherein the k logical threads have one-to-one correspondence with the k message queues set on the server, and the logical thread of the logical operation type directly writes the data packet obtained after the logical operation into the corresponding message queue; and reading the data packet obtained after the logical operation from the message queue according to the frame identifier, and synchronizing the data packet obtained after the logical operation to an associated client.

2. The method according to claim 1, wherein the writing, after the data packet is transmitted to a logical thread corresponding to the thread identifier for a logical operation, a data packet obtained after the logical operation into a message queue corresponding to the logical thread comprises:

transmitting the data packet to an $i^{th}$ logical thread in the k logical threads according to the thread identifier, the $i^{th}$ logical thread corresponding one to one to an $i^{th}$ message queue in the k message queues, i being a positive integer, i≤k;
  performing the logical operation on the data packet by using the $i^{th}$ logical thread to obtain the data packet obtained after the logical operation; and
  writing the data packet obtained after the logical operation into the $i^{th}$ message queue.

3. The method according to claim 1, wherein the reading the data packet obtained after the logical operation from the message queue according to the frame identifier, and synchronizing the data packet obtained after the logical operation to an associated client comprises:

determining a frame identifier of a currently consumed frame by the k message queues;
  reading a data packet corresponding to the frame identifier of the currently consumed frame; and
  synchronizing the data packet corresponding to the frame identifier of the currently consumed frame to the associated client.

4. The method according to claim 3, wherein a data packet corresponding to a target frame identifier is written into the k message queues;

the reading a data packet corresponding to the frame identifier of the currently consumed frame from the k message queues comprises:
  in response to that the frame identifier of the currently consumed frame is the target frame identifier, sequentially reading a data packet having the target frame identifier from the k message queues, until all data packets having the target frame identifier in the k message queues have been read.

5. The method according to claim 3, wherein a data packet corresponding to a target frame identifier is written into the k message queues, and the k message queues respectively correspond to respective duration thresholds; and the reading a data packet corresponding to the frame identifier of the currently consumed frame from the k message queues comprises:
  reading the data packet corresponding to the frame identifier of the currently consumed frame from the k message queues according to the duration thresholds respectively corresponding to the k message queues, for an $n^{th}$ message queue in the k message queues, the reading comprising:
  acquiring a duration threshold corresponding to the $n^{th}$ message queue, n being a positive integer, n≤k;
  reading a data packet having the target frame identifier from the $n^{th}$ message queue; and
  in response to that a reading duration of the $n^{th}$ message queue exceeds the duration threshold corresponding to the $n^{th}$ message queue, starting to read a data packet having the target frame identifier from an $(n+1)^{th}$ message queue.

6. The method according to claim 5, wherein the duration threshold is obtained by using a consumption duration corresponding to the message queue, and the consumption duration is an estimated duration of reading a data packet corresponding to one picture frame from the message queue.

7. The method according to claim 3, wherein the data packet corresponding to the frame identifier of the currently consumed frame comprises a first type data packet, and the first type data packet includes second position coordinates of a second virtual object in the picture frame identified by the frame identifier; and the method further comprises:
  performing field of view area division on the picture frame identified by the frame identifier according to the second position coordinates, to obtain m field of view areas, m being a positive integer; and
  in response to that the second position coordinates are not in a specified field of view area in the m field of view areas, filtering out the first type data packet from the data packet corresponding to the frame identifier of the currently consumed frame.

8. The method according to claim 7, further comprising:
  acquiring a field of view list corresponding to the m field of view areas, the field of view list comprising q second virtual objects in the m field of view areas, q being a positive integer; and
  in response to that the second virtual object corresponding to the first type data packet is not a second virtual object in the field of view list, filtering out the first type data packet from the data packet corresponding to the frame identifier of the currently consumed frame.

9. The method according to claim 7, wherein the server stores first position coordinates of a first virtual object controlled by the client, and the method further comprises:
  acquiring a position relationship between the first position coordinates and the second position coordinates; and
  in response to that the position relationship meets a preset condition, filtering out the first type data packet from the data packet corresponding to the frame identifier of the currently consumed frame.

10. The method according to claim 9, wherein the preset condition comprises at least one of the following conditions:
  a distance between the first virtual object and the second virtual object is greater than a distance threshold; or
  the second virtual object is outside a field of view of the first virtual object.

11. The method according to claim 3, wherein the data packet corresponding to the frame identifier of the currently consumed frame comprises a second type data packet, and the second type data packet includes an attribute parameter of a virtual object; and the method further comprises:
  in response to that the attribute parameter remains unchanged, instructing the client to reduce a transmission frequency of the second type data packet.

12. The method according to claim 3, the synchronizing the data packet corresponding to the frame identifier of the currently consumed frame to the associated client comprises:
  transmitting the data packet corresponding to the frame identifier of the currently consumed frame to a packet generation thread; and
  synchronizing the data packet to the associated client by using the packet generation thread.

13. A computer device, the computer device comprising a processor and a memory, the memory storing at least one instruction, at least one program, a code set or an instruction set, the at least one instruction, the at least one program, the code set, or the instruction set being loaded or executed by the processor to implement:
  receiving a data packet transmitted by a client, the data packet including a thread identifier and a frame identifier, the thread identifier being added by the client according to a logical operation type of a logical operation required to be performed on data in the data packet, the frame identifier being used for identifying a picture frame triggering the data packet, wherein the logical operation type includes at least one of a skill logical operation, an attribute logical operation, a position logical operation, a user operation logical operation, or an animation effect logical operation, and wherein data in a same data packet requires a same type of logical operation;

writing, after the data packet is transmitted to a logical thread corresponding to the thread identifier for a logical operation of the corresponding logical operation type, a data packet obtained after the logical operation into a message queue corresponding to the logical thread, wherein k logical threads have one-to-one correspondence with k message queues set on the computer device, and the logical thread of the logical operation type directly writes the data packet obtained after the logical operation into the corresponding message queue; and reading the data packet obtained after the logical operation from the message queue according to the frame identifier, and synchronizing the data packet obtained after the logical operation to an associated client.

14. A non-transitory computer-readable storage medium, storing a computer program, the computer program, when executed by at least one processor of a server, causing the at least one processor to perform:

receiving a data packet transmitted by a client, the data packet including a thread identifier and a frame identifier, the thread identifier being added by the client according to a logical operation type of a logical operation required to be performed on data in the data packet, the frame identifier being used for identifying a picture frame triggering the data packet, wherein the logical operation type includes at least one of a skill logical operation, an attribute logical operation, a position logical operation, a user operation logical operation, or an animation effect logical operation, and wherein data in a same data packet requires a same type of logical operation;

writing, after the data packet is transmitted to a logical thread corresponding to the thread identifier for a logical operation of the corresponding logical operation type, a data packet obtained after the logical operation into a message queue corresponding to the logical thread, wherein k logical threads have one-to-one correspondence with k message queues set on the server, and the logical thread of the logical operation type directly writes the data packet obtained after the logical operation into the corresponding message queue; and reading the data packet obtained after the logical operation from the message queue according to the frame identifier, and synchronizing the data packet obtained after the logical operation to an associated client.

15. The non-transitory computer-readable storage medium according to claim 14, wherein the writing, after the data packet is transmitted to a logical thread corresponding to the thread identifier for a logical operation, a data packet obtained after the logical operation into a message queue corresponding to the logical thread comprises:

transmitting the data packet to an $i^{th}$ logical thread in the k logical threads according to the thread identifier, the $i^{th}$ logical thread corresponding one to one to an $i^{th}$ message queue in the k message queues, i being a positive integer, i≤k;

performing the logical operation on the data packet by using the $i^{th}$ logical thread to obtain the data packet obtained after the logical operation; and writing the data packet obtained after the logical operation into the $i^{th}$ message queue.

16. The non-transitory computer-readable storage medium according to claim 14, wherein the reading the data packet obtained after the logical operation from the message queue according to the frame identifier, and synchronizing the data packet obtained after the logical operation to an associated client comprises:

determining a frame identifier of a currently consumed frame by the k message queues;

reading a data packet corresponding to the frame identifier of the currently consumed frame; and synchronizing the data packet corresponding to the frame identifier of the currently consumed frame to the associated client.

17. The non-transitory computer-readable storage medium according to claim 16, wherein a data packet corresponding to a target frame identifier is written into the k message queues;

the reading a data packet corresponding to the frame identifier of the currently consumed frame from the k message queues comprises:

in response to that the frame identifier of the currently consumed frame is the target frame identifier, sequentially reading a data packet having the target frame identifier from the k message queues, until all data packets having the target frame identifier in the k message queues have been read.

18. The non-transitory computer-readable storage medium according to claim 16, wherein a data packet corresponding to a target frame identifier is written into the k message queues, and the k message queues respectively correspond to respective duration thresholds; and the reading a data packet corresponding to the frame identifier of the currently consumed frame from the k message queues comprises:

reading the data packet corresponding to the frame identifier of the currently consumed frame from the k message queues according to the duration thresholds respectively corresponding to the k message queues, for an $n^{th}$ message queue in the k message queues, the reading comprising:

acquiring a duration threshold corresponding to the $n^{th}$ message queue, n being a positive integer, n≤k;

reading a data packet having the target frame identifier from the $n^{th}$ message queue; and in response to that a reading duration of the $n^{th}$ message queue exceeds the duration threshold corresponding to the $n^{th}$ message queue, starting to read a data packet having the target frame identifier from an $(n+1)^{th}$ message queue.

19. The non-transitory computer-readable storage medium according to claim 18, wherein the duration threshold is obtained by using a consumption duration corresponding to the message queue, and the consumption duration is an estimated duration of reading a data packet corresponding to one picture frame from the message queue.

20. The non-transitory computer-readable storage medium according to claim 17, wherein the data packet corresponding to the frame identifier of the currently consumed frame comprises a first type data packet, and the first type data packet includes second position coordinates of a second virtual object in a picture frame identified by the frame identifier; and the computer program further causes the at least one processor to perform:

performing field of view area division on the picture frame identified by the frame identifier of the currently consumed frame according to the second position coordinates, to obtain m field of view areas, m being a positive integer; and in response to that the second position coordinates are not in a specified field of view area in the m field of view areas, filtering out the first type data packet from the data packet corresponding to the frame identifier of the currently consumed frame.

\* \* \* \* \*